(12) United States Patent
Daems et al.

(10) Patent No.: US 6,304,707 B1
(45) Date of Patent: Oct. 16, 2001

(54) OPTICAL FIBER ORGANIZER

(76) Inventors: Daniel Daems, De Dreef van Zonnebos 10, 2970 'Gravenwezel; Luk Macken, Kortrijksestraat 20, Kessel-Lo; Hendrik Graulus, Groenstraat 69, 3020-Veltem-Beisen, all of (BE)

( * ) Notice: Subject to any disclaimer, the term of this patent is extended or adjusted under 35 U.S.C. 154(b) by 0 days.

(21) Appl. No.: 09/125,857

(22) PCT Filed: Nov. 19, 1997

(86) PCT No.: PCT/GB97/00549

§ 371 Date: Aug. 26, 1998

§ 102(e) Date: Aug. 26, 1998

(87) PCT Pub. No.: WO97/07480

PCT Pub. Date: Sep. 4, 1997

(30) Foreign Application Priority Data

Feb. 29, 1996 (GB) .................................................. 9604369
Nov. 20, 1996 (GB) .................................................. 9624147

(51) Int. Cl.⁷ ..................................................... G02B 6/00
(52) U.S. Cl. ............................. 385/135; 385/71; 385/134; 385/136; 385/137
(58) Field of Search ............................. 385/71, 134, 135, 385/136, 137

(56) References Cited

FOREIGN PATENT DOCUMENTS

| 4439853 A1 | 5/1996 | (DE) | ................................. | G02B/6/36 |
| 0215668 | 3/1987 | (EP) | ................................. | G02B/6/44 |
| 0715196 A1 | 6/1996 | (EP) | ................................. | G02B/6/44 |
| 95/07475 | 3/1995 | (WO) | ................................ | G02B/6/00 |
| 95/07480 | 3/1995 | (WO) | ................................ | G02B/6/38 |
| 95/25978 | 9/1995 | (WO) | ................................ | G02B/6/44 |

*Primary Examiner*—Cassandra Spyrou
*Assistant Examiner*—Craig Curtis
(74) *Attorney, Agent, or Firm*—Allen, Dyer, Doppelt, Milbrath & Gilchrist, P.A.

(57) ABSTRACT

A kit of parts for forming an optical fiber organizer comprises at least two different modules selected from: (i) a storage module comprising a support plate supporting at least one optical fiber storage means; (ii) a breakout module comprising a support plate supporting at least one optical fiber breakout means; and (iii) a guide module comprising a support plate supporting a plurality of projections between which optical fibers may be guided. Each module is attachable either directly or indirectly to each other module such that their support plates are arranged side-by-side and thereby together form a larger support plate. The organizer may be housed in an optical fiber cable splice closure.

42 Claims, 8 Drawing Sheets

OPTICAL FIBER ORGANIZER

FIELD OF THE INVENTION

The present invention relates to the organization of optical fibers, e.g. in an optical fiber cable splice closure.

Many different designs of optical fiber organizer are known. For example, WO 95/07480 (Raychem) discloses a base for an optical fiber organizer, which comprises: a first passage along one longitudinal edge portion for incoming fibers; a second passage along an opposite longitudinal edge portion for outgoing fibers; a plurality of first fiber guides separated from one another along the length of the base and extending from the first passage across the base towards the second passage where fibers in said guides are directed away from the plane of the base; and a plurality of second fiber guides separated from one another along the length of the base and extending from the second passage across the base towards the first passage where fibers in said guides are directed away from the plane of the base.

WO 95/07475 (British Telecom) discloses an optical fiber management system comprising a plurality of splice trays arranged in a stack. Each splice tray has a main body portion for holding at least one splice, and for storing fibers leading to the splice(s), and a fiber entry/exit portion for feeding fiber to/from the main body portion. Each tray is mounted in the stack so as to be movable from a stacked position, in which it is aligned with the other trays, to first and second operating positions in which the fiber entry/exit portion and the main body portion respectively are accessible.

WO 95/25978 (Raychem) discloses an apparatus for arranging a plurality of stacks of optical fiber splice organizers in a closure, comprising a frame and at least two optical fiber splice organizer supports located on the frame, each organizer support being arranged to support a stack of organizers. The frame may be elongate and the organizer supports may each support a stack of organizers which extends laterally with respect to the frame. The organizer supports may be in one or more pairs, the supports of each pair being arranged back-to-back.

SUMMARY OF THE INVENTION

According to a first aspect, the invention provides a kit of parts for forming an optical fiber organizer, comprising at least two different modules selected from the following different modules:
 (i) a storage module comprising a support plate supporting at least one optical fiber storage means;
 (ii) a breakout module comprising a support plate supporting at least one optical fiber breakout means; and
 (iii) a guide module comprising a support plate supporting a plurality of projections between which optical fibers may be guided;
whereby each module is attachable either directly or indirectly to each other module such that their support plates are arranged side-by-side and thereby together form a larger support plate.

Preferably, the kit further comprises a support to which each module may be attached. By attachment of each module to the support, indirect attachment of each module to the or each other module results.

According to a second aspect, the invention provides a kit of parts for forming an optical fiber organizer, comprising:
 (a) a support; and
 (b) at least two different modules selected from the following different modules:
  (i) a storage module comprising a support plate supporting at least one optical fiber storage means;
  (ii) a breakout module comprising a support plate supporting at least one optical fiber breakout means;
  (iii) a guide module comprising a support plate supporting a plurality of projections between which optical fibers may be guided;
whereby the modules are attachable to the support side-by-side such that their support plates together form a larger support plate.

The support preferably comprises a frame. Additionally or alternatively, the support may comprise a plurality of interconnectable parts.

Each optical fiber storage means preferably comprises a tray. By an "optical fiber storage tray" is meant any generally flat optical fiber storage means, normally having two major surfaces, which storage means stores lengths of optical fiber and preferably also stores one or more splices, splitters, connections or other optical or optoelectronic devices associated with the optical fiber(s). By "generally flat" is meant that the tray will normally be substantially larger in two of its dimensions than its third dimension. Furthermore, the tray need not have a substantially uniform thickness. Optical fiber storage trays are sometimes called "cassettes". The major surfaces of the tray may be discontinuous (e.g. having holes or in the form of a mesh or a frame), and this also includes the possibility that the "surface" is only present at edges of the tray. Advantageously, each optical fiber storage tray may be hinged with respect to the support plate which supports it. Each optical fiber storage module preferably includes a plurality of optical fiber storage trays.

According to a third aspect, the invention provides a kit of parts for forming an optical fiber organizer, comprising:
 (a) a support frame; and
 (b) a plurality of modules, each of which comprises a support plate supporting at least one of the following:
  (i) a plurality of hinged optical fiber storage trays;
  (ii) at least one optical fiber breakout means;
  (iii) at least one optical fiber guide means;
whereby the modules are attachable to the support frame side-by-side such that their support plates together form a larger support plate.

In preferred embodiments of the invention, the support frame comprises at least two spaced-apart parts to which each module may be attached such that its support plate substantially spans the gap between the spaced-apart parts. Each spaced-apart part is preferably elongate in shape. Advantageously, the support frame may further comprise at least one elongate cross-member which extends between the two elongate parts.

Each module, preferably the support plate of the module, preferably includes one or more attachment devices by which it may be attached to the support. Preferably each attachment device is interlockable with the support.

Each storage module is preferably able to store at least one loop of optical fiber without bending the fiber below its critical bend radius. For example, in embodiments in which the storage module includes one or more optical fiber storage trays, each tray preferably stores at least one loop of optical fiber. The storage trays or other storage means may also store optical fiber splices, splitters or other passive or active devices.

The or each optical fiber breakout means preferably comprises a first passage for retaining a first tube carrying a plurality of optical fibers, and a plurality of second passages for retaining a plurality of second tubes each of which carries at least one optical fiber extending from the first tube. The or each optical fiber breakout module preferably includes a plurality of optical fiber breakout means.

According to a fourth aspect of the present invention, there is provided a kit of parts for forming an optical fiber organizer, comprising:

(a) one or more optical fiber storage tray(s);

(b) at least one optical fiber guide element, to which said one or more optical fiber storage tray(s) may be directly or indirectly attached, the or each guide element including one or more optical fiber guide(s) arranged to guide at least part of the length of at least one optical fiber, which length extends, in use, between the exterior of the organizer and said storage tray(s); and (c) a base, to which a plurality of said guide elements may be directly or indirectly attached, the base comprising a frame.

According to a fifth aspect of the invention, there is provided a kit of parts for forming an optical fiber organizer, comprising:

(a) at least two optical fiber storage tray(s);

(b) at least two optical fiber guide elements, to each of which at least one said optical fiber storage tray may be directly or indirectly attached, each guide element including one or more optical fiber guide(s) arranged to guide at least part of the length of at least one optical fiber, which length extends, in use, between the exterior of the organizer and said storage tray(s); wherein at least two said optical fiber guide elements may be directly connected together.

The optical fiber guide elements of this fifth aspect of the invention may preferably be directly connected together in a self-supporting manner. Alternatively, the kit may further comprise a base, e.g. a frame, to which the guide elements may be directly or indirectly attached. The guide elements are preferably interconnectable by means of interlocking parts and/or by means of fastening devices, e.g. screws, bolts or the like.

In this specification, the terms "support" and "base" (when used in reference to the kits and organizers of the invention) are interchangeable.

According to a sixth aspect, the invention provides an optical fiber organizer assembled from a kit according to any of the other aspects of the invention.

According to a seventh aspect, the invention provides a closure comprising a casing, and an optical fiber organizer according to the sixth aspect of the invention contained inside the casing. The closure may, for example, be a cable splice closure, or a cabinet, or a module of a distribution frame.

According to an eighth aspect, the invention provides a kit of parts for forming an optical fiber cable closure, comprising a kit according to any of the first to fifth aspects of the invention, and a casing for enclosing the optical fiber organizer. The casing (according to the seventh and eighth aspects of the invention) preferably comprises a casing base containing cable ports, and a generally dome-shaped cover attachable to the casing base, the optical fiber organizer being attachable to the casing base.

The fourth and fifth aspects of the invention have the advantage that because the optical fiber guides are provided on optical fiber guide elements which may be attached to a base and/or connected together, it is not necessary to produce a range of base plates (e.g. of the type disclosed in WO95/07480) in order to cater for the range of types, sizes and numbers (i.e. quantities), of optical fiber carriers (e.g. different sizes of tubes, or ribbons carrying different numbers of fibers) which are used today, and which may be used in the future, in optical fiber networks. Instead, a kit according to the invention, having the correct guide element or elements, or the correct mix of different guide elements, may be chosen for each network, or each application or type of application in a network. Thus the invention provides an increased level of modularity, enabling kits having the correct number(s) and/or type(s) and/or size(s) of optical fiber guides for each network or application to be provided. Additionally or alternatively, a range of types and/or sizes of optical fiber guide elements may be provided in the kit, enabling the installer to select from the kit the correct number, size and/or type of optical fiber guides for each particular situation.

The or each optical fiber guide element in the kit may advantageously be in the form of a plate (or like generally flat structure), e.g. a support plate.

Preferably, the or each optical fiber guide element has an entrance and an exit through which, in use, one or more optical fiber(s) extend(s), respectively, into the guide, and out of the guide and into a storage tray attached directly or indirectly to the guide element. The guide exit preferably directs the or each optical fiber exiting through it away from the plane of the guide element (e.g. the plane of the plate, for embodiments in which the guide element is in the form of a plate) and towards the storage tray in which is it stored. The or each storage tray preferably extends away from the guide element to which it is directly or indirectly attached at an angle in the range 35° to 90°, preferably 40° or 45° to 90°, with respect to the plane of the guide element (the trays are preferably pivotable within the range of angles 35° to 145°, more preferably 45° to 135°, to this plane). Thus, the directing of the optical fiber(s) by the guide exit normally helps to avoid significant stresses being placed on the optical fiber(s) in the region between the guide and the tray. Advantageously, the exit of the or each guide may comprise a ramp or the like which directs the optical fiber(s) away from the plane of the guide element with a minimum bend radius which is at least equal to the critical bend radius of the fiber(s).

When the terms "entrance" and "exit" are used herein, they generally do not refer to the direction of light signals carried by the optical fibers, but instead refer to the normal direction in which the optical fibers are inserted into the optical fiber guides, and the direction in which they exit the guides while being passed through the guides. Ordinarily, optical fibers (normally carried by tubes or other carriers, or in ribbons of say 4 to 12 fibers) are inserted into, and guided through, the optical fiber guides in the guide elements before they are stored in the optical fiber storage trays.

When it is stated herein that the optical fiber guides are arranged to guide at least part of the lengths of optical fibers which extend between the exterior of the organizer and the storage trays, this includes the possibility that the fibers are in ribbons or other carriers, or that one or more tubes or other carriers are placed on or around such lengths of fibers inside or outside the organizer.

Advantageously, the or each optical fiber guide of the, or at least one, guide element of the kit is arranged to guide at least one ribbon (preferably only one ribbon) of optical fibers. More preferably, the guide exit is wider, in the plane of the guide element, than the guide entrance, such that, in use, a ribbon of fibers is guided into the guide entrance with its width (i.e. its relatively wide dimension) at least approximately perpendicular to the plane of the guide element (e.g. at least 60°, and preferably at least 70°, to the plane of the guide element), and is guided out of the guide exit with its width approximately parallel to the plane of the guide element (e.g. no more than 40°, and preferably no more than 30°, to the plane of the guide element). The width of the guide entrance is preferably no greater than 5 mm, more preferably no greater than 3 mm, e.g. about 2 mm. The width of the guide exit is preferably at least 5.5 mm, more preferably at least 6 mm or 7 mm.

Accordingly a ninth aspect of the invention provides an optical fiber guide element, comprising a plate to which one or more optical fiber storage tray(s) may be directly or indirectly attached, the or each guide element including one or more optical fiber guide(s) for guiding one or more ribbon(s) of optical fibers into a said storage tray, the or each guide having an entrance and an exit through which said ribbon(s) of fibers may extend, respectively, into the guide, and out of the guide and into a said tray, and whereby the guide exit is wider, in the plane of the plate, than the guide entrance, such that, in use, a ribbon of fibers is guided into the guide entrance with its width at least approximately perpendicular, and is guided out of the guide exit with its width at least approximately parallel, with respect to the plane of the plate.

This aspect of the invention has the advantage that significant stresses on the optical fibers of the ribbon are substantially prevented. This is because the ribbons may be guided into the guides in a plane substantially parallel to the plane of the guide element, and because the width of the ribbon is approximately perpendicular (e.g. 60° to 90°, preferably 70° to 90°) to these planes, the ribbon may be bent within this plane in order to be routed into the guide. The ribbon is gradually twisted in the guide from entrance to exit so that at the exit of the guide its orientation is approximately or substantially perpendicular to it entrance orientation. The ribbon may therefore be bent in order to be routed into a storage tray attached, in use, directly or indirectly to the guide element, which storage tray is oriented at an angle of, say, 35° to 90°, preferably 45° to 90° with respect to the plane of the guide element. The bending of the ribbons of optical fibers should, of course, respect the critical bend radius of the individual fibers.

The or each optical fiber guide in an optical fiber guide element preferably comprises a groove in the element. Preferably, each guide element has a plurality of such grooves in a surface thereof. The guides are preferably arranged in a mutually substantially parallel series. Adjacent guides in the series are preferably oriented in opposite directions, such that the entrance of one guide is next to the exit of an immediately adjacent guide, and vice versa. In use, two or more guide elements are preferably attached to the base and/or connected to each other, in a series (e.g. extending along the base). The guides in the guide elements are preferably substantially perpendicular to the direction of extension of the series of guide elements. The optical fiber storage trays are preferably arranged, in use, in a series along the series of guide elements. The optical fiber storage trays are preferably substantially parallel to the guides, and extend away from the plane of the guide elements. Optical fiber(s) guided through one or more of the guides is/are preferably routed into a respective optical fiber storage tray from the exit(s) of the guide(s).

In some preferred embodiments of the invention, each guide element includes mounting means for mounting a plurality of optical fiber storage trays thereto. In such embodiments, therefore, the guide elements themselves comprise support plates. When optical fiber storage trays are attached, the combination comprises a storage module.

In other preferred embodiments of the invention, the kit further comprises at least one support element to which, in use, the or each optical fiber storage tray is directly attached, which support element is directly or indirectly attached to the optical fiber guide element. Preferably, the or each optical fiber storage tray is pivotally attached to the support element. The support element preferably has the form of a plate or other generally flat structure.

The kit may further comprise at least one cover plate which, in use, it attached to at least one respective guide element such that it overlies the or each groove, thereby substantially preventing lateral displacement of optical fibers from said groove(s). The or each cover plate may comprise a continuous plate, or it may contain holes or be in the form of a grid etc. The or each support element (where present) is preferably attached, in use, to at least one cover plate.

Most preferably, therefore, for some embodiments, in use, the guide elements are attached to the base and/or to each other, the cover plate(s) is/are attached to the guide elements, the support element(s) is/are attached to the cover plate(s), and the optical fiber storage trays are attached to the support element(s). In such embodiments, therefore, a guide element, cover element and support element together comprise a support plate. When the optical fiber storage trays are attached, it comprises a storage module. The attachments may generally be made in any suitable way. Preferably, however, the various parts of the kit interlock (e.g. as a snap-fit) with the or each part to which they are attached in use. Alternatively, other fastening means, e.g. adhesive, screws, nuts and bolts or the like may be used.

BRIEF DESCRIPTION OF THE DRAWINGS

The invention will now be described, by way of example, with reference to the accompanying drawings, of which.

DETAILED DESCRIPTION OF THE PREFERRED EMBODIMENTS

Figure 1A:
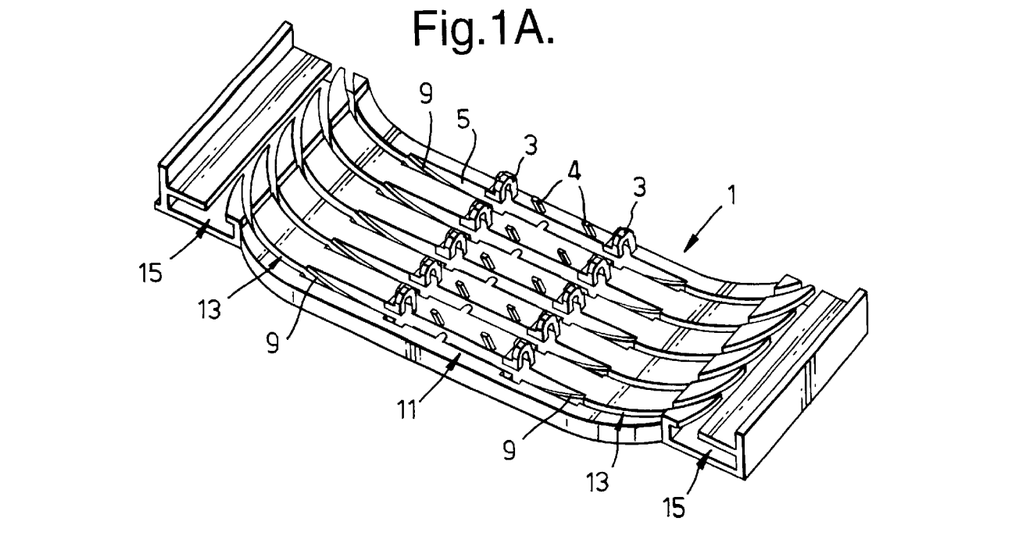
FIGS. 1A–1C show a modular support plate for hinged optical fiber storage trays.
Figure 1B:
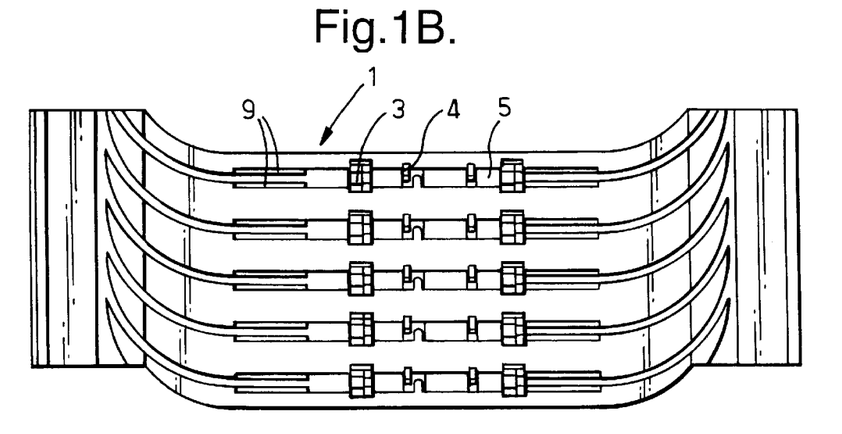
Figure 1C:
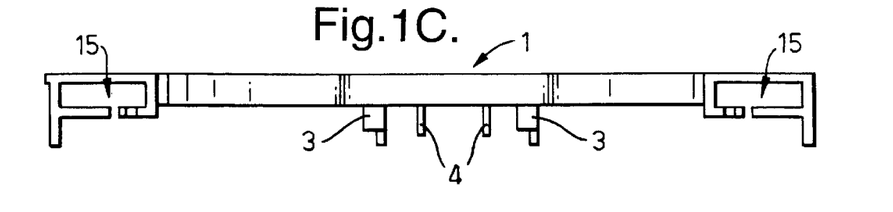

FIG. 1 shows a modular support plate 1 comprising a plurality of pairs of mounting means 3 in the form of integrally molded protrusions standing up from the plate.

The mounting means 3 contain apertures for receiving hinge pins formed on the storage trays. The storage trays are therefore hinged with respect to the support plate in use. Each of the trays may therefore be accessed by pivoting all of the trays on one side of the tray, away from the tray. FIG. 1 also shows flexible tines 4 (also protruding from the support plate) which lock the hinge pins of the trays in the mounting pins 3.

Each pair of mounting means 3 is associated with a respective guide 5 which is in the form of an open-sided groove in the plate. In use, an optical fiber storage tray 7 (see FIG. 3) is attached to a particular pair of mounting means 3, and one or more optical fibers or ribbons of optical fibers extending from the tray is received in the respective guide groove 5. Because the guide grooves 5 are open-sided, such optical fibers are inserted into them by "side-entry", i.e. without having to thread the fibers through an aperture. This has the advantage of enabling uncut (looped) optical fibers to be stored in the trays, for example in single circuits or single elements.

Each guide groove 5 includes four ramps 9 which, in use, guide one or more optical fibers or ribbons of optical fibers between the guide and its respective storage tray, i.e. the ramps guide the fibers away from the support plate towards the hinged tray mounted on the support plate. The ramps are situated in a relatively wide central region 11 of each guide. At each end 13 of the guide, the guide is narrower in width and is also curved in the plane of the support plate. At the ends of the guides, and extending substantially perpendicularly to the straight central regions of the guides, are optical fiber routing channels 15, for routing the optical fibers or ribbons from the guides 5 to the exterior of the organizer. An optical fiber, or a ribbon of optical fibers, may therefore extend from the exterior of the organizer (e.g. from a cable) along one routing channel 15 and into one end 13 of a respective guide 5. The fiber or ribbon may extend along the guide 5 across part of the width of the support plate and up one or both ramps into a storage tray mounted to the support plate (mounted by attachment to the respective mounting means 3). The fiber or ribbon may be looped one or more times in the storage tray, extend out of the tray and down the opposite ramps into the same guide 5. It will extend along the guide 5 past the first ramps out of the opposite end of the guide, into the other routing channel 15 and then to the exterior of the organizer.

When ribbons of optical fibers are used, the major width of the ribbons will generally be substantially perpendicular to the plane of the support plate in the routing channels 15 and the relatively narrow end regions 13 of the guides 5. However, in the relatively wide central regions 11 of the guides, the ribbons will normally twist through about 90° so that in the regions where they are guided towards the trays by the ramps 9 their major widths will generally be substantially parallel to the plane of the support. The dimension of the guides are preferably predetermined to cause or facilitate this change in the orientation of the ribbons which is required because optical fiber ribbons generally must not be bent about an axis which is perpendicular to their major width.

Figure 2A:
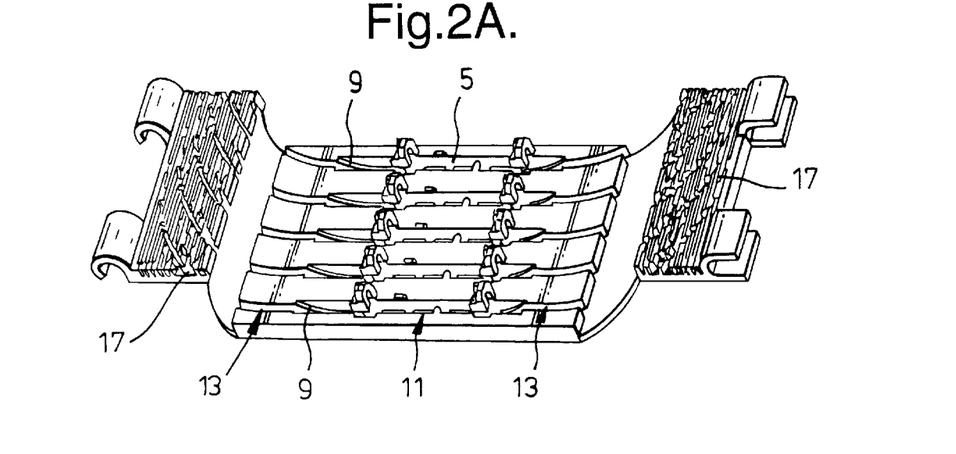
FIGS. 2A–2B show another modular support plate for hinged optical fiber storage trays.
Figure 2B:
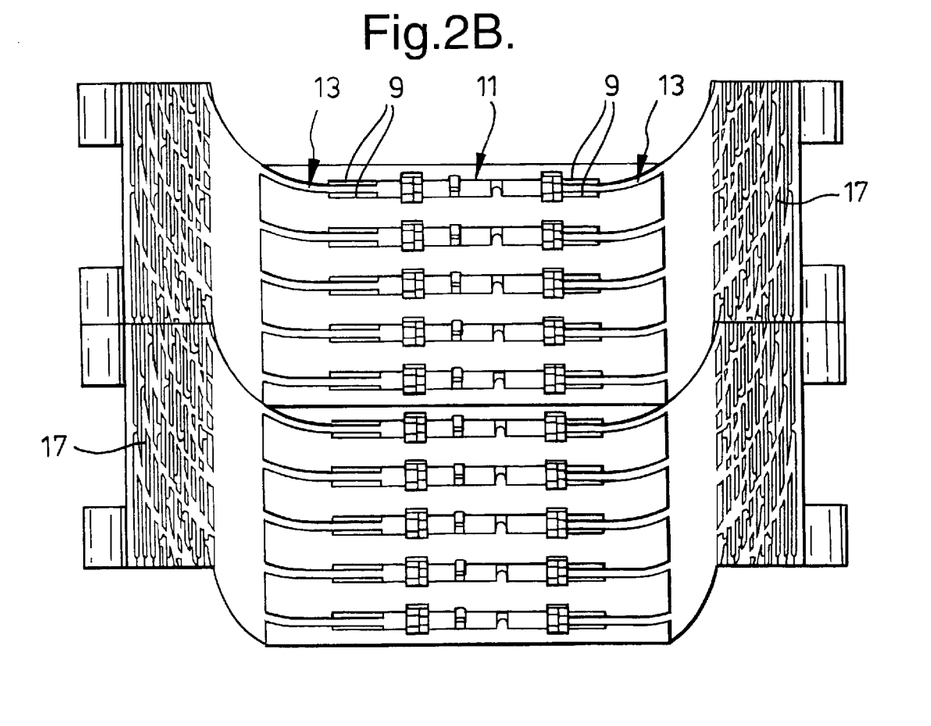

The support plates illustrated in FIGS. 2A and 2B are similar to the support plate illustrated in FIG. 1, except that the routing channels comprise a plurality of narrow channels 17 designed to route optical fiber ribbons orientated such that their major width is substantially perpendicular to the plane of the support plates. In FIG. 2B two support plates are arranged side-by-side, thereby forming a larger support plate.

Figure 3:
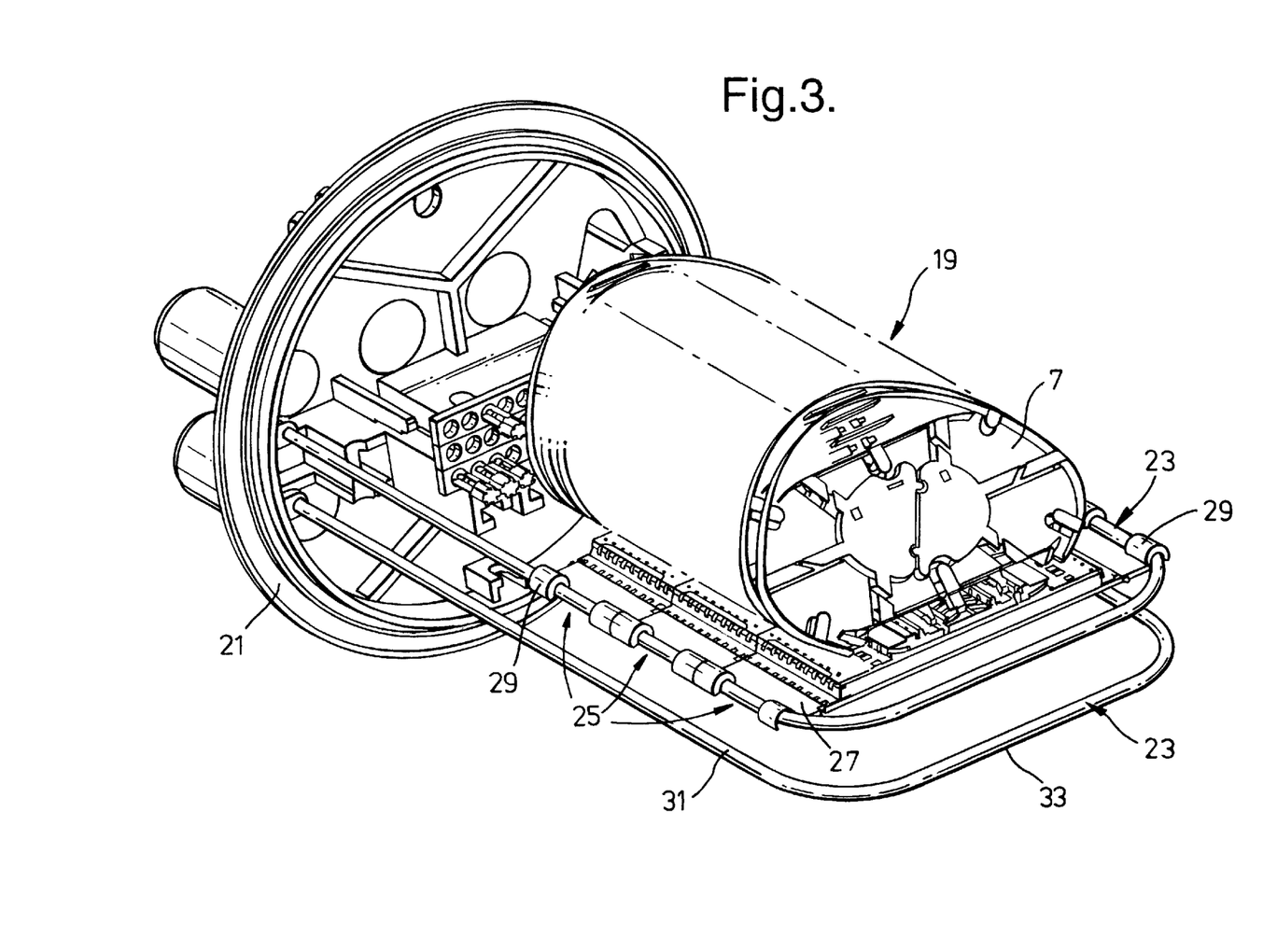
FIG. 3 shows an assembled optical fiber organizer according to the invention attached to a base of a cable closure.

FIG. 3 shows an optical fiber organizer 19 according to the invention, which has been assembled and attached to a base 21 of a cable closure. The organizer 19 comprises a support frame 23 and a plurality (three as drawn) storage modules 25 attached to the support frame 23 side-by-side such that their support plates 27 together form a larger support plate.

Each storage module 25 comprises a support plate 27 (of different design to the support plates shown in FIGS. 1 and 2) supporting a plurality of hinged optical fiber storage trays 7. Each support plate 27 includes attachment devices 29 which are interlocked (by a snap-fit) with the support frame 23.

The support frame 23 is formed in two parts, each of which comprises a pair of spaced-apart elongate parts 31 which are interconnected by an elongate cross-member 33. Each elongate part 31 is anchored to the base 21 of the closure. The support frame 23 as illustrated comprises a plurality of interconnected tubes (e.g. formed from metal), but other types of frame are possible, for example as shown in FIG. 5.

Figure 4A:
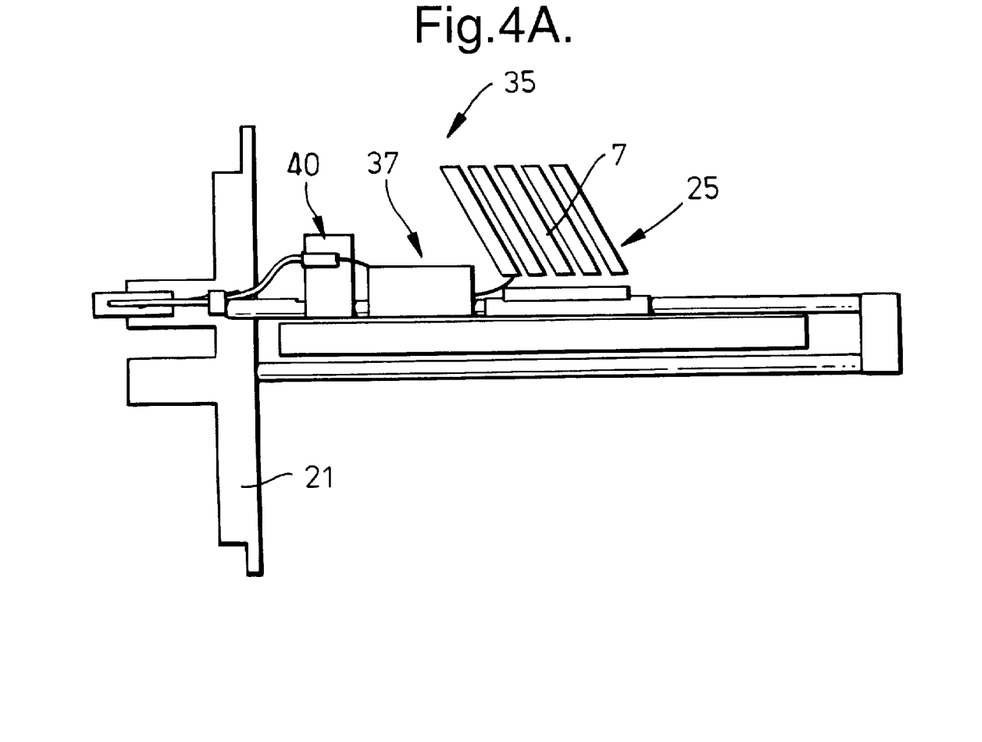
FIGS. 4A–4B show, schematically, another assembled optical fiber organizer according to the invention attached to a base of a cable closure.
Figure 4B:
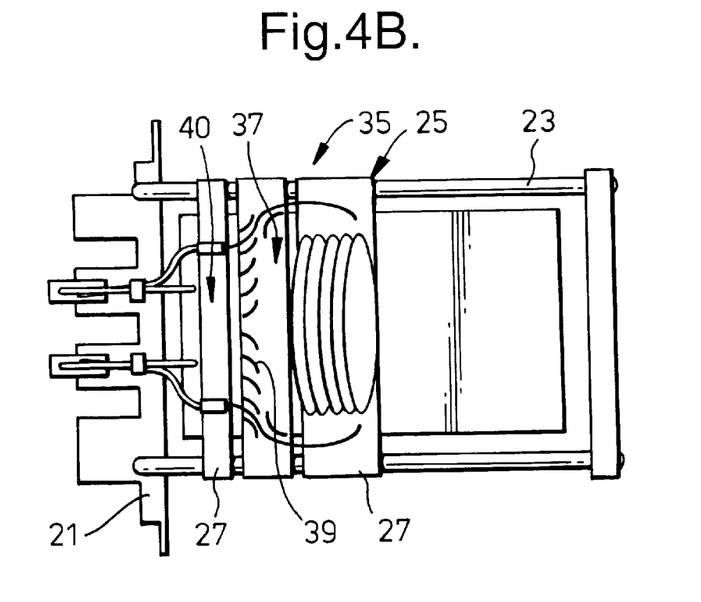

FIGS. 4A and 4B are schematic illustrations of another assembled optical fiber organizer 35 according to the invention, which is also attached to a base 21 of a closure. This organizer includes three different modules attached to the support frame 23 side-by-side. One of the modules is a storage module 25 as shown in FIG. 3. The module adjacent to the storage module 23 is a guide module 37 comprising a support plate 27 supporting a plurality of curved wall projections 39 between which optical fibers may be guided. Adjacent to the guide module 37 is a break out module 40 comprising a support plate 27 supporting a plurality of breakout means 41. Even though there is a gap between each adjacent support plate 27 attached to the support frame, the effect is the formation of a larger support plate containing all of the various module elements.

Figure 5:
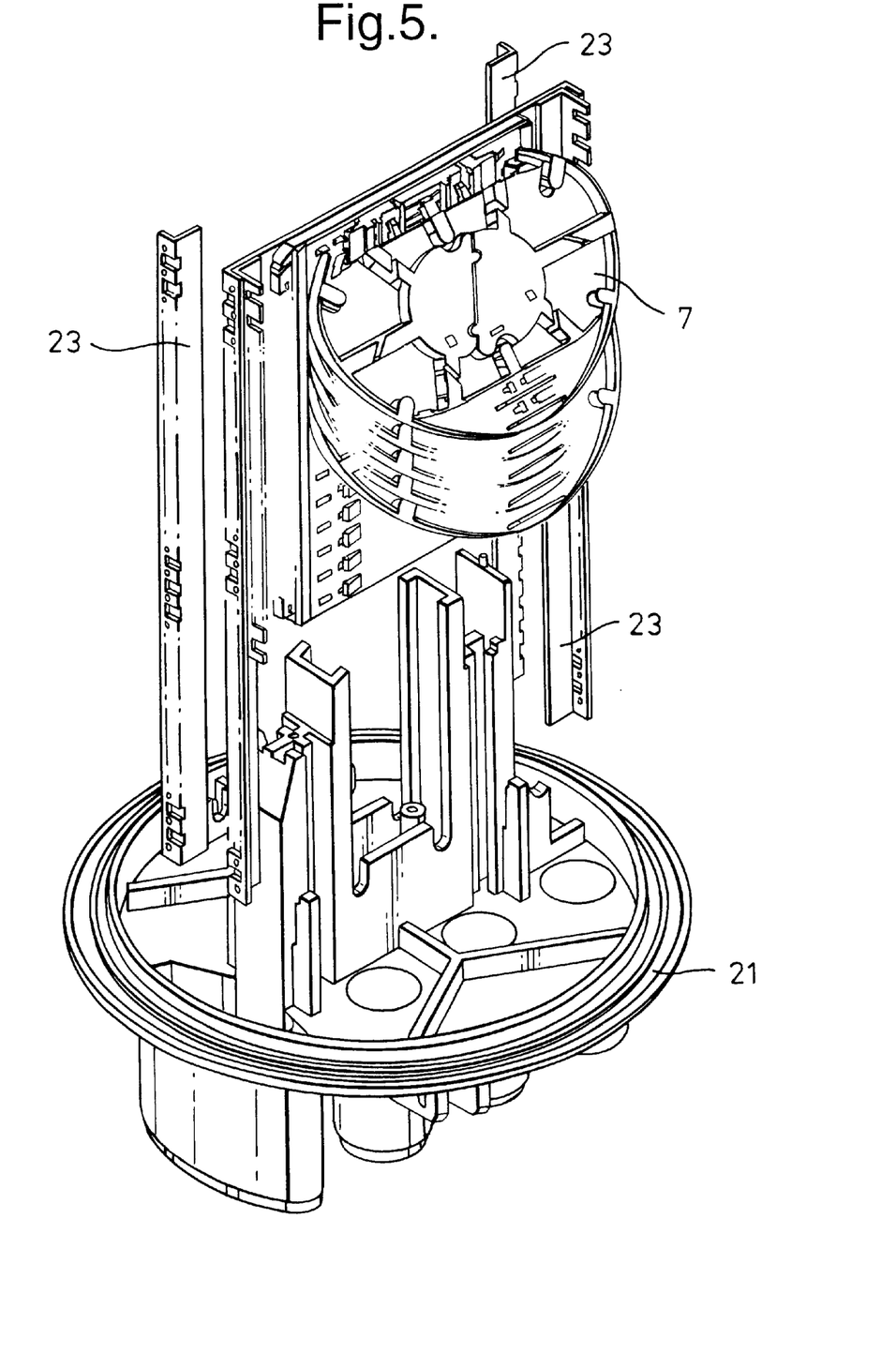
FIG. 5 shows a further assembled optical fiber organizer according to the invention attached to a base of a cable closure.

FIG. 5 shows a further organizer according to the invention attached to a base of a closure.

Figure 6:
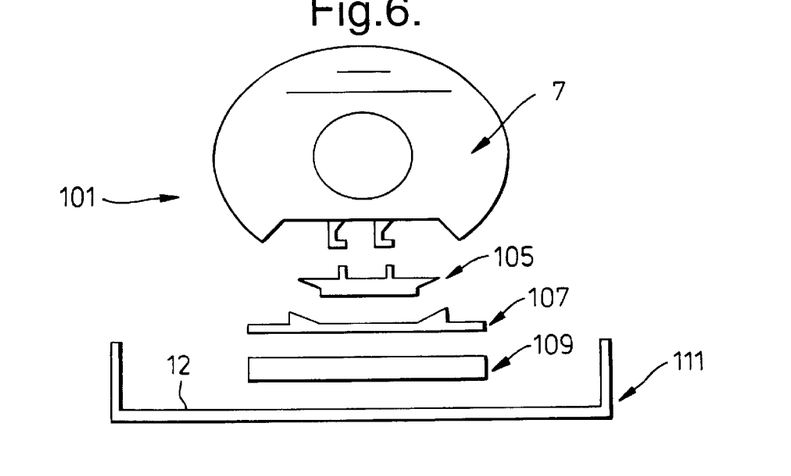
FIG. 6 is a schematic illustration of the major parts of another kit according to the invention

FIG. 6 is schematic illustration of another kit of parts 101 according to the invention. The kit comprises one or more optical fiber storage trays 7, one or more support elements 105 (in the form of plates), one or more cover plates 107, one or more guide elements 109 (in the form of plates) and one or more bases 111 (also in the form of plates). A support element 105, a cover plate 107, and a guide element 109 together comprise a support plate (i.e. when they are connected together), e.g. equivalent to those shown in FIGS. 1 to 5. A support element, cover plate, guide element and optical fiber storage trays together comprise a storage module.The guide elements 109 may be attached to the main surface 112 of the base 111 (see FIG. 7) to form a series of guide elements along the base. The attachment of the guide elements 109 to the base 111 is preferably by means of interlocking parts (not shown), or by means of adhesive.

Figure 7:
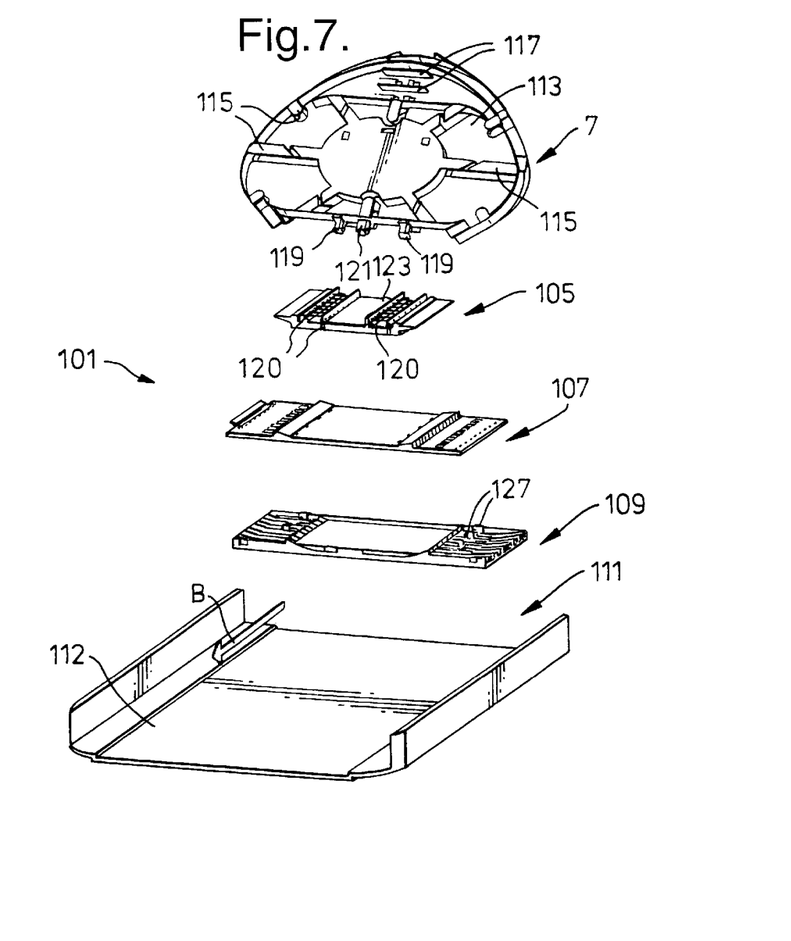
FIG. 7 is a perspective illustration of the parts shown in FIG. 6.
Figure 9:
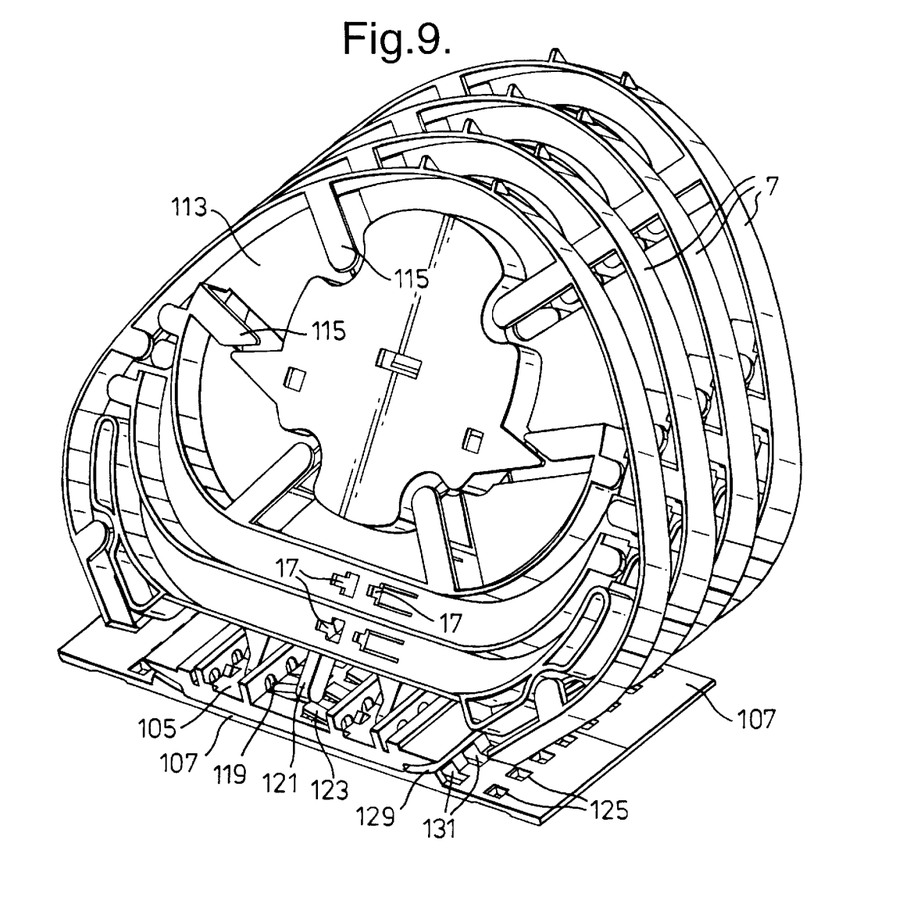
FIG. 9 is an illustration of a series of optical fiber storage trays attached to support plates and cover plates, of a kit according to the invention.

The various parts of the kit 101 are shown in greater detail in FIG. 7. Two optical fiber storage trays 7 are illustrated. The trays 7 are generally round (oval) in shape, although other shapes could be used. Optical fibers are stored, in use, on a major surface 113 of the tray 7 and are retained in place by means of fiber retainers 115. Optical fiber splices, splitters, connectors, or other devices may also be stored on the trays, in the device retainers 117. The trays 7 are pivotally attached, in use, to a support element 105, by means of pivot pins 119. This is shown in greater detail in FIG. 9, which shows a series of optical fiber storage trays 3 (which are slightly different to those shown in FIG. 7)

pivotally attached to two support elements 105 which are in turn attached to two cover plates 107 (the support elements 105 and the cover plates 107 being substantially the same as those shown in FIG. 7). The pivot pins 119 are located in holes 120 on the support elements 105, and are retained in place by means of an extending arm 121 of the tray which is held in place by flexible tines 123 on the support elements 105. The trays 7, as illustrated in FIG. 9, are inclined at an angle of about 45° with respect to the plane of the support elements/cover plates (which plane is parallel to those of the guide elements and the base). The trays can preferably pivot between about 45° and about 135° to these planes, to allow access to the surface 113 of each tray in the series.

In FIG. 9, the support elements 105 are attached (preferably as an interlocking snap-fit) to the cover plates 107. The cover plates 107 have holes 125 which, in use, interlock with corresponding resilient protrusions 127 on the guide elements 109 (see FIGS. 7 and 8). The cover plates 107 also have upwardly—inclined (i.e. inclined towards the trays 7) portions 129 which contain upwardly—inclined openings 131. In use, these openings 131 each contain an exit ramp 133 of a guide 135 of a guide element 109 (see FIG. 8).

Figure 8A:
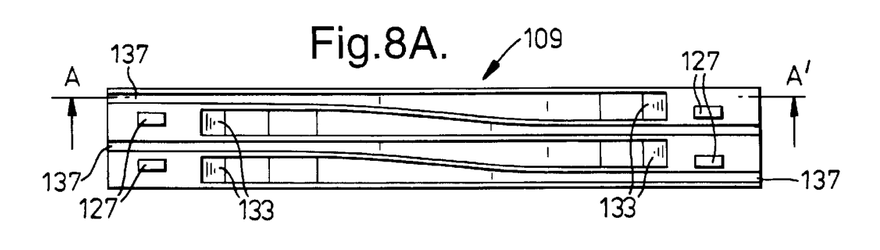
FIG. 8 is a detail of a guide element of a kit according to the invention.
Figure 8B:
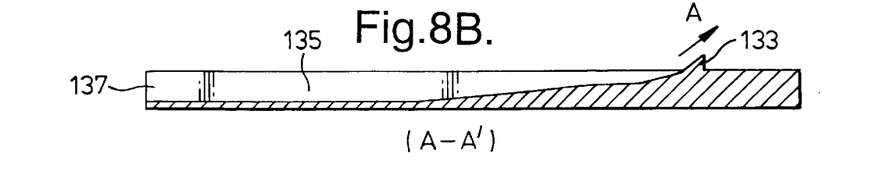

Each guide element 109 (of which a part, including four guides 135, is shown in FIG. 8) comprises a series of guides 135 in the form of mutually substantially parallel grooves. Adjacent guide grooves 135 in the series are oriented in opposite directions, such that the entrance 137 of one guide groove 135 is next to the exit 133 of an immediately adjacent guide, and vice versa. Towards the exit 133 of each guide groove 135, the guide groove becomes shallower, and at the exit 133 is a ramp which, in use directs optical fibers extending out of the exit away from the plane of the guide element plate 109 and towards a respect optical fiber storage tray 7 attached above the guide element plate 109, as indicated by the arrow A. Also, on going from the entrance 137 to the exit 133 of each guide groove 135, the guide groove becomes narrower in width (i.e. in the plane of the guide element plate 109). This has the effect, in use, of twisting (or turning) a ribbon of optical fibers (not shown) extending along the guide groove 135, from an orientation in which, at the entrance 137 the width of the ribbon is substantially perpendicular to the plane of the guide element plate, to an orientation in which, at the exit 133 the width of the ribbon is substantially parallel to the plane of the guide element plate. This has the advantage that a ribbon of optical fibers entering the organizer as indicated in FIG. 7 by arrow B, i.e. along the base 111 in a vertical orientation (i.e. with its relatively wide dimension substantially perpendicular to the plane of the base plate 111) may be bent into a guide groove 135 of a guide element 109 attached to the base plate 111, and upon exiting the guide groove 35 it may be bent in order to route it into a tray 7 which is oriented at an angle of between about 45° and 90° to the base plate.

Figure 10:
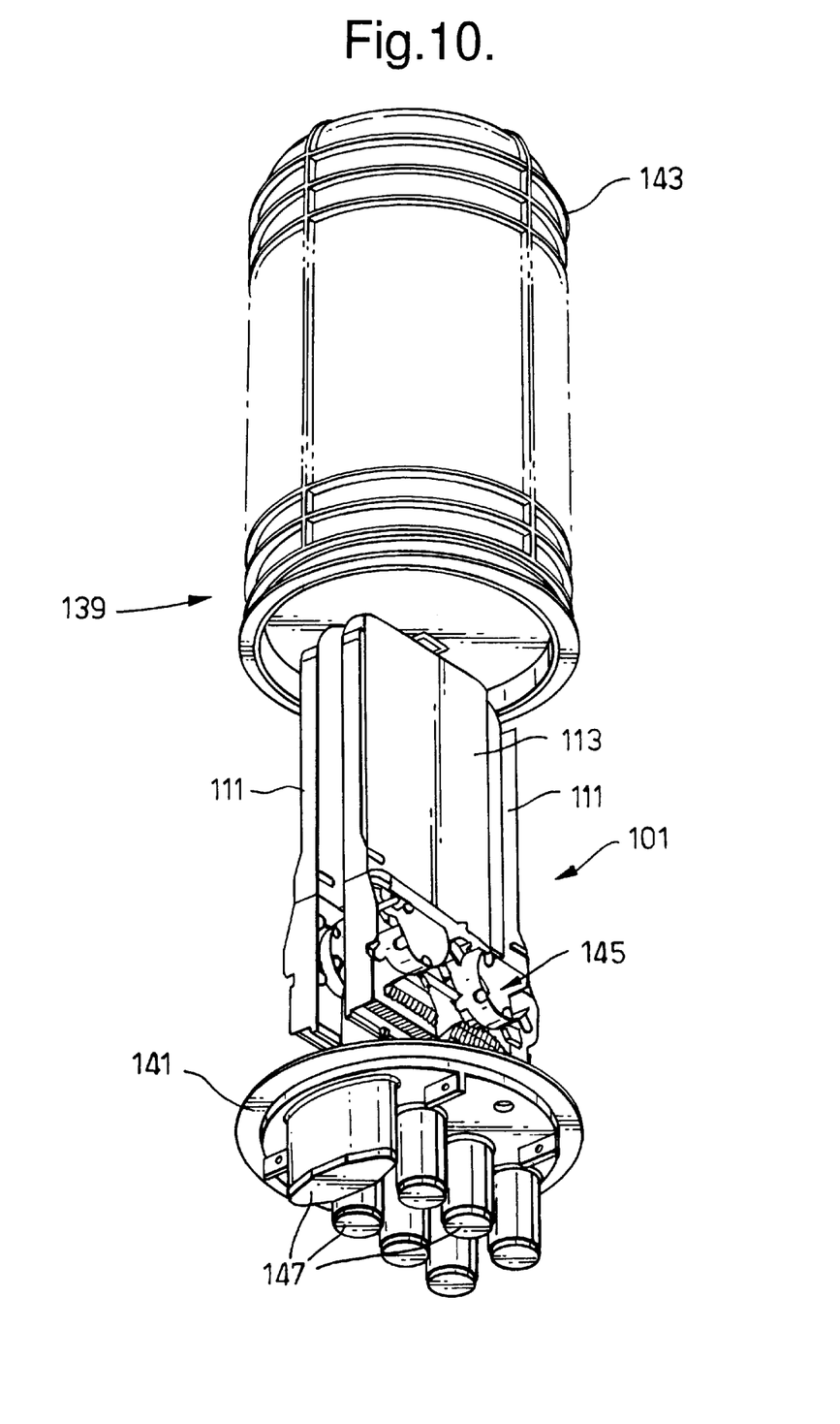
FIG. 10 is an illustration of a closure according to the invention.

FIG. 10 shows a closure 139 according to the invention. The closure 139 comprises a two-part casing (a bottom part 141 and a top-, or dome-part 143) and an optical fiber organizer 101 according to the invention. The closure includes two bases 111 (which, for clarity, are illustrated without trays or other attachments) which are mounted on the bottom part 141 of the casing. The parts 145 of the bases 111 contain optical fiber routing and management devices. The bottom part 141 includes cable-entry ports 147. The dome-part 143 may be secured to the bottom-part 141 by means of a clamping ring (not shown), and the closure is preferably sealed by an O-ring between the bottom part 141 and the dome-part 143.

What is claimed is:

1. A kit of parts for forming an optical fiber organizer, comprising:
    at least two different modules selected from the following different modules:
        (i) a storage module comprising a first support plate supporting at least one optical fiber storage device;
        (ii) a breakout module comprising a second support plate supporting at least one optical fiber breakout device; and
        (iii) a guide module comprising a third support plate supporting a plurality of projections for guiding optical fibers therebetween;
    said first, second and third support plates being different in construction from one another;
    each module being attachable either directly or indirectly to each other module such that their support plates are arranged side-by-side and thereby together form a larger support plate.

2. A kit according to claim 1, further comprising a support to which each module is to be attached, thereby indirectly attaching each module to the or each other module.

3. A kit according to claim 2, wherein said support comprises a plurality of interconnectable parts.

4. A kit according to claim 2, wherein said support comprises a frame.

5. A kit according to claim 1, wherein the or each optical fiber storage device comprises a tray.

6. A kit according to claim 5, in which the or each optical fiber storage tray is hinged with respect to a support plate which supports the optical fiber storage tray.

7. A kit according to claim 5, wherein the or each optical fiber storage module includes a plurality of optical fiber storage trays.

8. A kit of parts for forming an optical fiber organizer, comprising:
    (a) a support; and
    (b) at least two different modules selected from the different modules:
        (i) a storage module comprising a first support plate supporting at least one optical fiber storage device;
        (ii) a breakout module comprising a second support plate supporting at least one optical fiber breakout device; and
        (iii) a guide module comprising a third support plate supporting a plurality of projections for guiding optical fibers therebetween;
    said first, second and third support plates being different in construction from one another;
    the modules being attachable to the support side-by-side such that their support plates together form a larger support plate.

9. A kit according to claim 8, wherein said support comprises a plurality of interconnectable parts.

10. A kit according to claim 8, wherein-said support comprises a frame.

11. A kit according to claim 8, wherein the or each optical fiber storage device comprises a tray.

12. A kit according to claim 11, in which the or each optical fiber storage tray is hinged with respect to a support plate which supports the optical fiber storage tray.

13. A kit according to claim 11, wherein the or each optical fiber storage module includes a plurality of optical fiber storage trays.

14. A kit of parts for forming an optical fiber organizer, comprising:

(a) a support frame; and
(b) a plurality of modules, each of which comprises a support plate supporting at least one of the following:
   (i) a plurality of hinged optical fiber storage trays;
   (ii) at least one optical fiber breakout device; and
   (iii) at least one optical fiber guide;
the modules being attachable to the support frame side-by-side such that their support plates together form a larger support plate;
said support frame comprising at least two spaced-apart parts for attaching to each module such that the support plate of the module substantially spans a gap between the spaced-apart parts, and the support plate of each module including one or more attachment devices for attachment to the spaced-apart parts of the support frame.

15. A kit according to claim 14, wherein each spaced-apart part is elongate in shape.

16. A kit according to claim 15, wherein said support frame further comprises at least one elongate cross-member which extends between the two elongate parts.

17. A kit according to claim 14, wherein each attachment device is interlockable with the support frame.

18. A kit according to claim 14, wherein the or each storage module is for storing at least one loop of optical fiber without bending the fiber beyond a critical bend radius.

19. A kit according to claim 14, wherein the at least one optical fiber breakout device comprises:
a first tube and a first passage for retaining the first tube for carrying a plurality of optical fibers; and
a plurality of second tubes and a plurality of second passages for retaining the plurality of second tubes each of which carries at least one optical fiber extending from the first tube.

20. A kit of parts for forming an optical fiber organizer, comprising:
(a) one or more optical fiber storage trays;
(b) at least one optical fiber guide element, to which said one or more optical fiber storage trays are to be directly or indirectly attached, the or each guide element including one or more optical fiber guides arranged to guide at least part of the length of at least one optical fiber, which length extends, in use, between an exterior of the organizer and said storage trays; and
(c) a base, to which a plurality of said guide elements are to be directly or indirectly attached, the base comprising a frame;
the or each optical fiber guide element being in the form of a plate; wherein the or each optical fiber guide has an entrance and an exit through which, in use, said optical fibers extend, respectively, into the guide, and out of the guide and into said one or more optical fiber storage trays; wherein the guide exit is wider, in the plane of the plate, than the guide entrance, such that, in use, a ribbon of fibers is guided into the guide entrance with a width at least approximately perpendicular to the plane of the plate, and is guided out of the guide exit with the width approximately parallel to the plane of the plate.

21. A kit according to claim 20, further comprising at least one support element to which, in use, the or each said optical fiber storage tray is directly attached, which support element is directly or indirectly attached to said optical fiber guide element.

22. A kit according to claim 21, wherein, in use, the or each optical fiber storage tray is pivotally attached to the support element.

23. A kit according to claim 20, wherein the or each said optical fiber guide comprises a groove in the optical fiber guide element.

24. A kit according to claim 23, further comprising at least one cover plate which, in use, is attached to at least one respective guide element such that it overlies the or each groove, thereby substantially preventing lateral displacement of optical fibers from said grooves.

25. A kit according to claim 24, wherein, in use, said support element is attached to said cover plate.

26. A kit according to claim 20, further comprising a casing for enclosing the optical fiber organizer.

27. A kit according to claim 26, wherein the casing comprises a casing base containing cable ports, and a generally dome-shaped cover attachable to the casing base, the optical fiber organizer being attachable to the casing base.

28. A kit of parts for forming an optical fiber organizer, comprising:
(a) at least two optical fiber storage tray; and
(b) at least two optical fiber guide elements, to each of which at least one said optical fiber storage tray is to be directly or indirectly attached, each guide element including one or more optical fiber guides arranged to guide at least part of the length of at least one optical fiber, which length extends, in use, between an exterior of the organizer and said storage trays, at least two of said optical fiber guide elements to be directly connected together;
the or each optical fiber guide element being in the form of a plate; wherein the or each optical fiber guide has an entrance and an exit through which, in use, said optical fibers extend, respectively, into the guide, and out of the guide and into said one or more optical fiber storage trays; wherein the guide exit is wider, in the plane of the plate, than the guide entrance, such that, in use, a ribbon of fibers is guided into the guide entrance with a width at least approximately perpendicular to the plane of the plate, and is guided out of the guide exit with the width approximately parallel to the plane of the plate.

29. A kit according to claim 28, further comprising at least one support element to which, in use, the or each said optical fiber storage tray is directly attached, which support element is directly or indirectly attached to said optical fiber guide element.

30. A kit according to claim 28, wherein the or each said optical fiber guide comprises a groove in the optical fiber guide element.

31. A kit according to claim 28, further comprising a casing for enclosing the optical fiber organizer.

32. A kit according to claim 29, wherein, in use, the or each optical fiber storage tray is pivotally attached to the support element.

33. A kit according to claim 30, further comprising at least one cover plate which, in use, is attached to at least one respective guide element such that it overlies the or each groove, thereby substantially preventing lateral displacement of optical fibers from said grooves.

34. A kit according to claim 33, wherein, in use, said support element is attached to said cover plate.

35. A kit according to claim 31, wherein the casing comprises a casing base containing cable ports, and a generally dome-shaped cover attachable to the casing base, the optical fiber organizer being attachable to the casing base.

36. An optical fiber guide element, comprising:

a plate to which one or more optical fiber storage trays is to be directly or indirectly attached, the or each guide element including one or more optical fiber guides for guiding one or more ribbons of optical fibers into the storage tray, the or each guide having an entrance and an exit through which the ribbons of fibers extend, respectively, into the guide, and out of the guide and into the storage tray, the guide exit being wider, in a plane of the plate, than the guide entrance, such that, in use, a ribbon of fibers is guided into the guide entrance with a width at least approximately perpendicular, and is guided out of the guide exit with the width at least approximately parallel, with respect to the plane of the plate.

37. A guide element according to claim 36, wherein said guide exit directs the or each optical fiber exiting therethrough away from the plane of the plate.

38. An optical fiber organizer, comprising:

at least two different modules selected from the following different modules:
  (i) a storage module comprising a first support plate supporting at least one optical fiber storage device;
  (ii) a breakout module comprising a second support plate supporting at least one optical fiber breakout device; and
  (iii) a guide module comprising a third support plate supporting a plurality of projections for guiding optical fibers therebetween;

said first, second and third support plates being different in construction from one another;

each module being attached either directly or indirectly to each other module such that their support plates are arranged side-by-side and thereby together form a larger support plate.

39. An optical fiber organizer, comprising:

(a) a support; and
(b) at least two different modules selected from the different modules:
  (i) a storage module comprising a first support plate supporting at least one optical fiber storage device;
  (ii) a breakout module comprising a second support plate supporting at least one optical fiber breakout device; and
  (iii) a guide module comprising a third support plate supporting a plurality of projections for guiding optical fibers therebetween;

said first, second and third support plates being different in construction from one another;

the modules being attached to the support side-by side such that their support plates together form a larger support plate.

40. An optical fiber organizer, comprising:

(a) a support frame; and
(b) a plurality of modules, each of which comprises a support plate supporting at least one of the following:
  (i) a plurality of hinged optical fiber storage trays;
  (ii) at least one optical fiber breakout device; and
  (iii) at least one optical fiber guide;

the modules being attached to the support frame side-by-side such that their support plates together form a larger support plate;

said support frame comprising at least two spaced-apart parts for attaching to each module such that the support plate of the module substantially spans a gap between the spaced-apart parts, and the support plate of each module including one or more attachment devices for attachment to the spaced-apart parts of the support frame.

41. An optical fiber organizer, comprising:

(a) one or more optical fiber storage trays;
(b) at least one optical fiber guide element, to which said one or more optical fiber storage trays are directly or indirectly attached, the or each guide element including one or more optical fiber guides arranged to guide at least part of the length of at least one optical fiber, which length extends, in use, between an exterior of the organizer and said storage trays; and
(c) a base, to which a plurality of said guide elements are directly or indirectly attached, the base comprising a frame;

the or each optical fiber guide element being in the form of a plate; wherein the or each optical fiber guide has an entrance and an exit through which, in use, said optical fibers extend, respectively, into the guide, and out of the guide and into said one or more optical fiber storage trays; wherein the guide exit is wider, in the plane of the plate, than the guide entrance, such that, in use, a ribbon of fibers is guided into the guide entrance with a width at least approximately perpendicular to the plane of the plate, and is guided out of thee guide exit with the width approximately parallel to the plane of the plate.

42. An optical fiber organizer, comprising:

(a) at least two optical fiber storage trays; and
(b) at least two optical fiber guide elements, to each of which at least one said optical fiber storage tray is directly or indirectly attached, each guide element including one or more optical fiber guides arranged to guide at least part of the length of at least one optical fiber, which length extends, in use, between an exterior of the organizer and said storage trays, at least two of said optical fiber guide elements being directly connected together;

the or each optical fiber guide element being in the form of a plate; wherein the or each optical fiber guide has an entrance and an exit through which, in use, said optical fibers extend, respectively, into the guide, and out of the guide and into said one or more optical fiber storage trays; wherein the guide exit is wider, in the plane of the plate, than the guide entrance, such that, in use, a ribbon of fibers is guided into the guide entrance with a width at least approximately perpendicular to the plane of the plate, and is guided out of the guide exit with the width approximately parallel to the plane of the plate.

* * * * *